United States Patent [19]

Cryer et al.

[11] 4,238,650
[45] Dec. 9, 1980

[54] ELECTRICAL SWITCH

[75] Inventors: Edward Cryer, Burnley; Norman Wilkinson, Nelson, both of England

[73] Assignee: Lucas Industries Limited, Birmingham, England

[21] Appl. No.: 910,516

[22] Filed: May 30, 1978

[30] Foreign Application Priority Data

Jun. 21, 1977 [GB] United Kingdom ............... 46136/77
Sep. 13, 1977 [GB] United Kingdom ............... 46137/77
Nov. 5, 1977 [GB] United Kingdom ............... 46133/77

[51] Int. Cl.³ .............................................. H01H 9/00
[52] U.S. Cl. ..................................... 200/4; 200/61.54
[58] Field of Search ........................ 200/4, 61.27, 61.3, 200/61.34, 61.35, 61.54

[56] References Cited

U.S. PATENT DOCUMENTS

| 3,718,784 | 2/1973 | Wilkinson | 200/61.27 |
| 3,892,932 | 7/1975 | Erdelitsch et al. | 200/61.54 X |
| 3,940,579 | 2/1976 | Buhl et al. | 200/4 |
| 4,129,757 | 12/1978 | Cryer | 200/61.54 X |

FOREIGN PATENT DOCUMENTS 2316779 10/1954 Fed. Rep. of Germany ........ 200/61.54
1385949 12/1964 France .
1503550 12/1967 France .

Primary Examiner—James R. Scott
Attorney, Agent, or Firm—Holman & Stern

[57] ABSTRACT

An electrical switch including a body and an elongate operating lever which extends from the body for manual operation. The lever, or at least part of the lever is rotatable about its longitudinal axis to effect a first switching action and is movable angularly relative to the body of the switch about an axis generally transverse to the longitudinal axis of the lever so as to effect a second switching action. An interlock arrangement is provided whereby in the angularly moved position of the lever rotational movement of the lever about its longitudinal axis is resisted.

4 Claims, 3 Drawing Figures

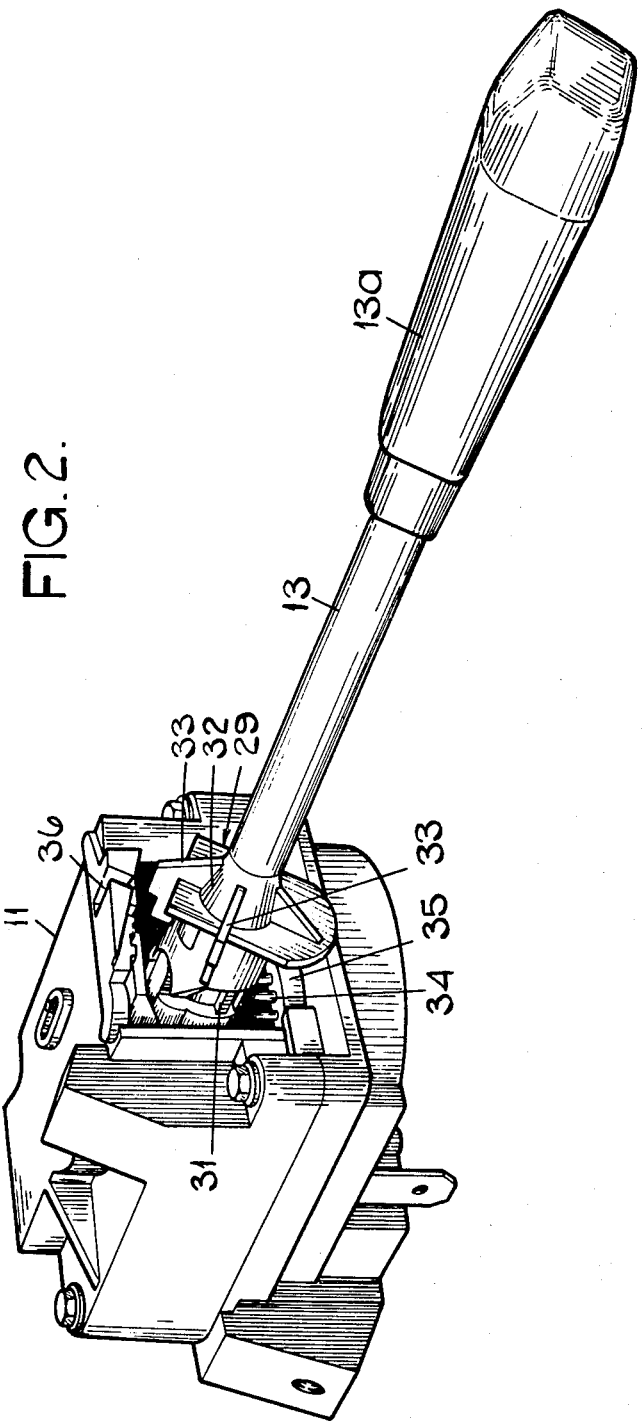

ELECTRICAL SWITCH

BACKGROUND OF THE INVENTION

This invention relates to an electrical switch of the kind including a body and an elongate operating lever extending from the body for manual operation, said lever or a part thereof being rotatable generally about its longitudinal axis relative to the body to effect a first switching action and being movable angularly relative to the body about an axis generally transverse to said longitudinal axis to effect a second switching action, the switch being particularly but not exclusively intended for use as a vehicle steering column mounted switch.

In certain previously proposed switches of the kind specified, an operator may unwittingly or accidentally operate the first switching action during operation of the second switching action and this can have undesirable results particularly where the first and second switching actions are interrelated, for example where both actions control lighting functions of a road vehicle. Moreover, in a previously proposed switch of the kind specified the rotation of the lever is transmitted to a movable contact carrier of the switch by way of meshing gear teeth on the lever and said contact carrier and said angular movement of the lever to effect said second switching action causes partial or total disengagement of the teeth such that rotation of the lever in its angularly moved position may take place relative to the contact carrier. Clearly where predetermined rotated positions are related by means for example of shaping or legends on the lever to particular operative positions of the carrier and therefore to particular functions of the apparatus controlled by the switch the rotation of the lever relative to the carrier without causing movement of the carrier is extremely disadvantageous. It is an object of the invention to obviate or minimise the aforementioned disadvantages of the previously proposed constructions.

SUMMARY OF THE INVENTION

According to the invention in a switch of the kind specified there is provided means operable in the angularly moved position of the lever, to resist rotational movement of the lever or said part thereof relative to the body.

Preferably the lever or said rotatable part thereof is provided with abutment means which co-operates with further abutment means of the switch in the angularly moved position of the lever to resist said rotation of the lever relative to the body.

Desirably said further abutment means is provided on a part of the switch fixed relative to said lever except in the direction of said angular movement.

Preferably said further abutment means is provided on the switch body.

Conveniently said abutment means on the lever or said part thereof is a projection and said further abutment means is the wall of a slot into which the projection extends in the angularly moved position of the lever.

Desirably where the lever, or said part thereof, has a plurality of predetermined rotated positions relative to the body, said abutment means on the lever, or said part thereof, is operable in co-operation with said further abutment means in said angularly moved position of the lever to resist rotation of the lever relative to the body in any one of said predetermined rotated positions.

Preferably the lever or said part thereof includes a respective projection associated with each of the predetermined rotated positions of the lever, the appropriate projections determined by the rotated position, being engageable in a slot in the body, in said angularly moved position of the lever to resist rotation of the lever relative to the body.

BRIEF DESCRIPTION OF THE DRAWINGS

One example of the invention is illustrated in the accompanying drawings wherein:

FIG. 2 is a perspective view of an alternative switch construction; and

DETAILED DESCRIPTION OF A PREFERRED EMBODIMENT

Figure 1:
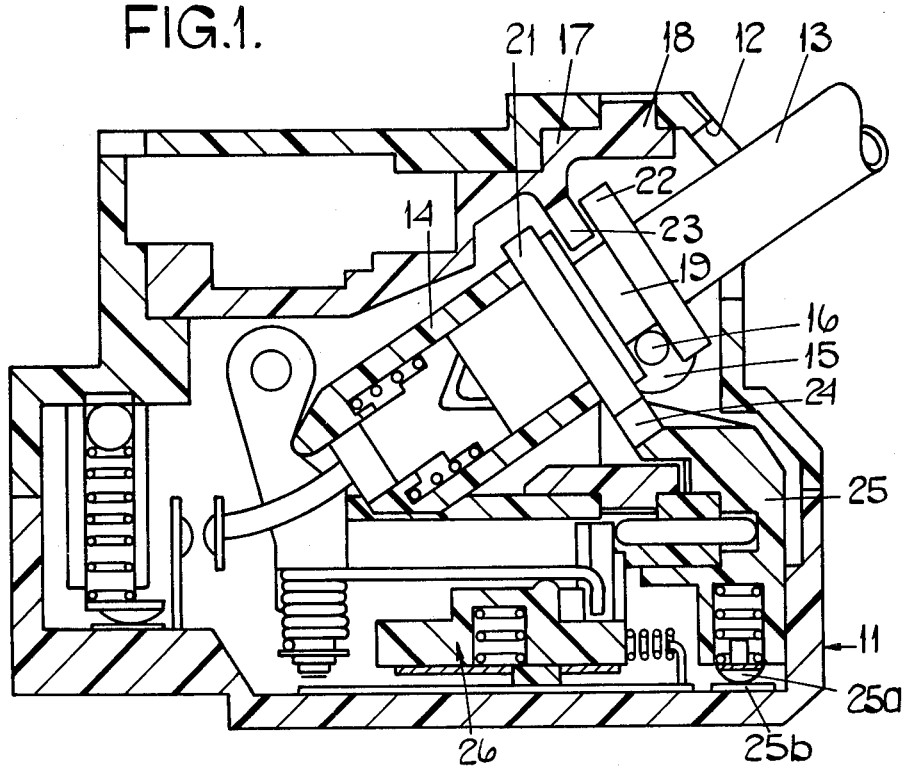
FIG. 1 is a sectional view of an electrical switch.

Referring first to FIG. 1 of the drawings, the electrical switch includes a two-part moulded synthetic resin body 11 having an aperture 12 in one wall thereof. Extending through the aperture 12 and into the hollow interior of the body 11 is an elongate operating lever 13 which, at its end within the body 11 is rotatably received in a pivot sleeve 14. The pivot sleeve 14 includes a lug 15 whereby the sleeve, and therefore the lever 13 is mounted for pivotal movement about an axis 16 in a moulded synthetic resin rotor 17 housed within the body 11. The rotor 17 is mounted for pivotal movement within the body 11 by a pair of axially aligned and spaced trunions, one of which is shown at 18 engaging in a corresponding aperture in the body 11. It will be recognised therefore that the lever 13 can be rotated relative to the body 11 about its longitudinal axis, the lever rotating in the sleeve 14, and furthermore the lever can be moved angularly relative to the body 11 about the axis 16 and angularly relative to the body 11 about the axis of the trunion 18. The axis of the trunions 18 is of course at right angles to the axis 16. The size of the aperture 12 is chosen to accommodate the range of movements of the lever 13 relative to the body 11.

Carried by the lever 13 adjacent the sleeve 14 is a moulded synthetic resin drive unit 19 which rotates with the lever 13. The drive unit 19 is formed integrally with a drive gear wheel 21 and an abutment means, for example a star wheel 22, the two wheels being parallel and spaced apart in the direction of the axis of the drive unit 19. A further abutment means, for example a part 23 of the rotor 17 extends between the drive wheel 21 and the star wheel 22.

The teeth of the drive gear wheel 21 mesh with a linear toothed rack 24 formed integrally on a moulded synthetic resin slide 25. The slide 25 is received in the body 11 adjacent a base of the body 11 for sliding movement in a direction parallel to the axis 16. Rotation of the lever 13 relative to the body results in simultaneous rotation of the drive unit 19 relative to the sleeve 14 and this rotational movement is transmitted to the slide 25, to cause linear sliding movement thereof on a direction parallel to the axis by way of the meshing teeth of the gear wheel 21 and the rack 24.

A moving contact 25a is carried by the slide 25 and is moved with the slide 25 relative to a series of fixed contacts 25b in response to rotation of the lever 13. Movement of the lever 13 about the axis 16 causes operation of a bistable contact arrangement 26, the lever 13 being resiliently biassed by its engagement with an element of the bistable contact arrangement 26 to the position shown in FIG. 1. In order to operate the bistable contact arrangement the lever 13 is displaced about the axis 16 in a counter-clockwise direction from the position shown. Upon release of the lever 13 it is returned to the position shown by the resilient bias.

The contacts of the switch, which form no part of the present invention, can of course control a wide variety of different functions. However, the particular switch shown in FIG. 1 is intended as a steering column mounted switch of a road vehicle with the rotational movement of the lever 13 and the angular movement of the lever 13 about the axis 16 serving to control lighting functions of the vehicle. The lever 13 has three predetermined angularly spaced rotational positions relative to the body in which three different electrical circuits are completed by way of the moving contact 25a of the slide 25. The circuit which is completed by way of the moving contact 25a determines the electrical circuits which will be operated by movement of the lever 13 about the axis 16. Thus it will be recognised that in one rotated position of the lever 13 the dipped beams of the vehicle may be energised and the intention may be that movement of the lever 13 about the axis 16 will switch the headlamps from dipped beam energisation to main beam energisation. However, in an alternative rotated position of the lever 13, the headlamps may be switched off completely and the same angular movement of the lever 13 about the axis 16 may result in momentary flashing of the main beams of the headlamps. Clearly when a driver is concentrating upon driving his vehicle and wishes for example, to switch from dipped to main beam he will merely move the lever 13 momentarily towards himself so moving the lever about the axis 16. However, unwittingly, or accidentally this movement may be accompanied by the driver attempting to rotate the lever 13. In the absence of anything to prevent the lever 13 rotating during such movement about the axis 16 it would be possible for the driver who intends to switch from main to dipped beam to in fact switch the lighting system by rotation of the lever 13, to its condition wherein the headlamps are not energised, and the angular movement merely serves to flash the headlamps. Thus upon release of the lever after the intended movement to put the headlamps on main beam the headlamps would in fact be completely extinguished. The extinguishing of the headlamps would of course be complete surprise to the driver with possible disasterous consequences.

In order to minimise the risk of rotation of the lever 13 during angular movement of the lever 13 about the axis 16 the star wheel 22 of the drive unit 19 is so arranged that in each of the predetermined rotated positions of the lever 13 an arm of the star wheel 22 is presented to a slot in the part 23 of the rotor 17. During movement of the lever 13 about the axis 16 the appropriate arm of the star wheel 22 will enter the slot of the part 23 and the cooperation between the side faces of the arm and the wall of the slot and between the side faces of adjacent arms and the surface of the part 23 into which the slot extends will prevent rotation of the lever relative to the body while the lever 13 remains in an angularly moved position.

Figure 3:
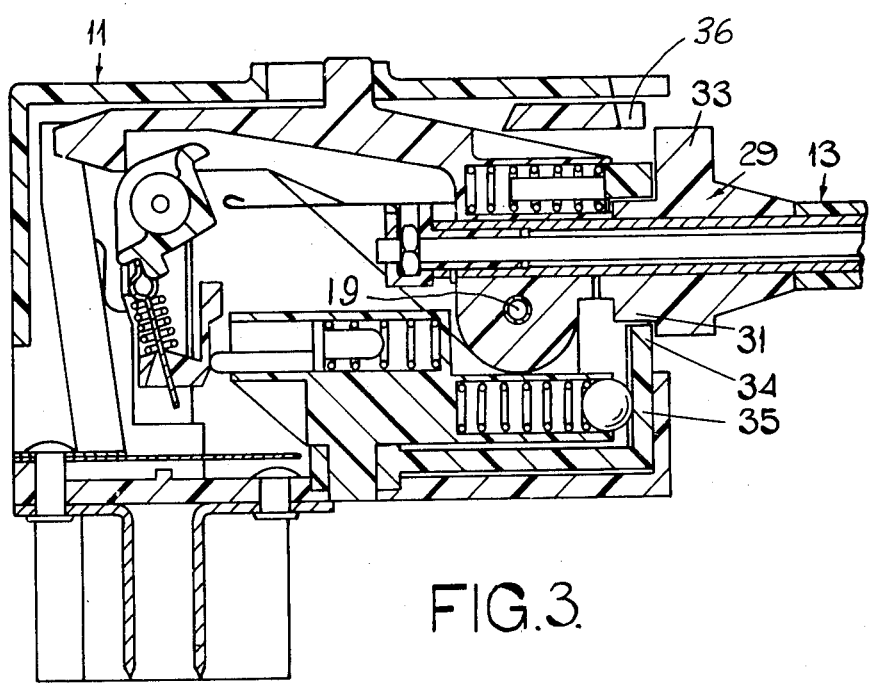
FIG. 3 is a sectional view of the switch shown in FIG. 2.

In the arrangement shown in FIGS. 2 and 3 the operating lever 13 again extends from the hollow body 11 and is rotatable relative to the body 11 about the longitudinal axis of the lever. Moreover the lever is again movable angularly in two mutually perpendicular planes relative to the body 11, the movement in both planes being movement about axes transverse to the length of the lever 13. It can be seen that the lever 13 carries an abutment means, for example, a moulded synthetic resin component 29 having a gear wheel portion 31 and a portion 32 having a plurality of angularly spaced radially projecting webs 33 integral therewith.

The teeth of the gear wheel portion 31 of the member 29 normally mesh with peg-like teeth 34 on an angularly movable contact carrier 35 housed within the body of the switch. As with the arrangement shown in FIG. 1 rotation of the lever 13 results by way of the meshing gear teeth, in movement of the carrier 35 relative to the body 11. The carrier 35 carries a movable contact which selectively engages fixed contacts on the body in accordance with the rotated position of the lever 13.

One of the permitted angular movements of the lever 13 relative to the body 11 is movement about an axis 19 such that the gear teeth of the gear wheel portion 31 are moved away from the gear teeth 34 of the contact carrier 35. The extent of the movement may be sufficient to completely disengage the teeth of the wheel 31 away from the teeth 34 although in some constructions merely the extent of the meshing engagement will be reduced. In the event that the teeth become completely disengaged then it is clear that rotation of the lever 13 will not be transmitted to the carrier 35. Where the extent of the meshing engagement is reduced then it is possible that the reduction will be such as to allow the teeth of the wheel 31 to ride over the teeth 34 so that again there is no positive driving connection whereby rotation of the lever 13 is transmitted to the carrier 35.

As in the FIG. 1 embodiment the contact arrangement of the switch forms no part of the present invention. However, for explanation it will be understood that the three permitted rotated positions of the lever 13 are related to specific switching functions, and the moulded synthetic resin knob 13a at the free end of the lever 13 is formed with legends presented to the operator of the switch in the free rotated position of the lever, the legends identifying for the driver the functions performed by the electrical circuits controlled by rotation of the lever. Clearly therefore if the lever 13 can be rotated without causing movement of carrier 35, then the relationship between the legends on the knob 13a and the actual circuits completed by the moving contact of the carrier 35 is lost. Moreover of course in some applications of the switch 11 the problem described with reference to the construction shown in FIG. 1 arises in that the circuits controlled by rotation of the lever 13 and the circuit controlled by the angular movement of the lever 13 may be interrelated in such a manner that rotation of the lever 13 inadvertently or unwittingly during movement of the lever angularly is undesirable.

In the arrangement shown in FIG. 2 the radially projecting webs 33 of the portion 32 of the member 29 can engage respectively in a further abutment means, for example, a slot 36 formed in the body 11. The webs 33 are so positioned in relation to the permitted rotated positions of the lever 13 that in each of the rotated positions of the lever 13 one or other of the webs 33 will be aligned with the slot 36 in the direction of angular movement of the lever 13. Thus upon angular movement of the lever 13 relative to the body 11 the appropriate web 33 will engage in the slot 36 and will thus prevent rotation of the lever 13 relative to the body 11, and of course relative to the contact carrier 35. A detent mechanism will act on the carrier 35 to resist movement of the carrier 35 relative to the lever 13 for example as a result of vibration in the event that the teeth of the gear wheel portion 31 disengage completely from the teeth 34. Upon release of the lever 13 in its angularly moved position a spring acting upon the lever 13 within the body returns the lever 13 to the rest position shown in FIG. 2 wherein the teeth on the gear wheel portion 31 mesh with the teeth 34 in the same relationship as prior to the angular movement of the lever 13.

It will be understood that in both of the switch constructions described above further movement of the lever 13 or at least part of the lever 13 may be possible to control different switching functions. However, these form no part of the present invention and so will not be described.

It is to be understood that while in both of the constructions described above the whole of the lever 13 can be rotated, and it would be possible to produce a construction wherein only part of the lever is rotatable. In such a construction the rotatable part of the lever is the part which will carry the abutment means co-operating with the further abutment means either on the body, or on a further part of the switch to prevent rotation of that part of the lever relative to the body in the angularly moved position of the lever.

We claim:

1. An improvement in a multi-mode electrical switch including a body, an elongate oporating lever extending from the body for manual operation, means mounting at least a portion of said lever for rotational movement with respect to said body about a longitudinal axis of the lever, further means mounting said lever, including said portion thereof, for pivoting movement with respect to said body about an axis generally transverse to said longitudinal axis, said lever being movable to at least first and second positions about said transverse axis, first switching means responsive to rotational movement of said portion of said lever about said longitudinal axis, and second switching means responsive to movement of said lever about said transverse axis, said improvement comprising: lock-out means including a first abutment movable with said portion of said lever, and a co-operating second abutment on part of the switch which is fixed relative to movement of said portion of said lever about both said transverse axis and said longitudinal axis, said first abutment being moved into engagement with said second abutment by movement of said lever to said second position about said transverse axis, whereby interengagement of said first and second abutments prevents rotation of said portion of the lever about said longitudinal axis, whereas in said first position of said portion of said lever about said transverse axis said abutment is spaced from said second abutment, whereby rotation of said portion of said lever about said longitudinal axis is permitted.

2. A switch as claimed in claim 1 wherein said first abutment is a projection on said portion and said second abutment is the wall of a slot into which the projection extends in the second position of the lever.

3. A switch as claimed in claim 1 wherein said portion has a plurality of predetermined rotated positions relative to the body, wherein said first abutment is operable in co-operation with said second abutment in said second position of the lever to resist rotation of the lever relative to the body in any one of said predetermined rotated positions.

4. A switch as claimed in claim 3 wherein said portion includes respective projections associated with each of the predetermined rotated positions of the lever, the appropriate projections, as determined by the rotated position, being engageable in a slot in the body in said second position of the lever to resist rotation of the lever relative to the body.

* * * * *